(12) United States Patent
Bisson et al.

(10) Patent No.: US 6,323,686 B1
(45) Date of Patent: Nov. 27, 2001

(54) CREST FACTOR COMPENSATED DRIVER

(75) Inventors: Robert Bisson, Kanata; Francois Tremblay, Hull, both of (CA)

(73) Assignee: Catena Networks, Inc., CA (US)

( * ) Notice: Subject to any disclaimer, the term of this patent is extended or adjusted under 35 U.S.C. 154(b) by 0 days.

(21) Appl. No.: 09/625,571

(22) Filed: Jul. 25, 2000

(30) Foreign Application Priority Data

Jul. 30, 1999 (CA) .................................................... 2279477

(51) Int. Cl.[7] .............................................. H03K 19/0175
(52) U.S. Cl. ................................ 326/82; 326/26; 326/30; 379/394
(58) Field of Search .................................. 326/21, 22, 26, 326/29, 30, 82, 83, 86; 379/414–417, 351, 394, 398

(56) References Cited

U.S. PATENT DOCUMENTS

| | | | |
|---|---|---|---|
| 4,961,219 | 10/1990 | Patel . | |
| 5,301,085 | * 4/1994 | Miettinen | 361/93 |
| 5,410,594 | 4/1995 | Maruyama . | |
| 5,515,433 | 5/1996 | Chen . | |
| 5,686,854 | * 11/1997 | Smith | 327/374 |
| 5,838,722 | * 11/1998 | Consi | 375/219 |
| 5,889,856 | 3/2000 | O'Toole et al. . | |
| 5,898,342 | 4/1999 | Bell | 330/297 |
| 6,067,316 | 5/2000 | Amrany et al. . | |
| 6,100,717 | 8/2000 | May . | |

* cited by examiner

*Primary Examiner*—Michael Tokar
*Assistant Examiner*—Don Phu Le
(74) *Attorney, Agent, or Firm*—Townsend & Townsend & Crew LLP (57) ABSTRACT

A telephone line feed circuit for use with a telecommunication line has dual drivers with differing ratio transformer taps and a sensing circuit so that under normal drive conditions a first driver supplies substantially all power through a first transformer of a first turns ratio under normal input signal conditions and a second driver supplies substantially all power through a second transformer of a second turns ratio under high crest factor input signal conditions.

19 Claims, 7 Drawing Sheets

CREST FACTOR COMPENSATED DRIVER

BACKGROUND OF THE INVENTION

This invention relates to a method and system for reducing power consumption in a line driver used in telecommunication systems.

Efforts have been made by manufacturers of Digital Subscriber Line (DSL) hardware to reduce overall power dissipation of DSL line cards. Although overall power reduction improvements have been made, significant power improvements in the field of line drivers have evidently not yet been made. Known relatively minor improvements have been due to crest factor reductions that in turn have precipitated a slight driver voltage rail reduction at the expense of processing speed, or so-called DSP MIPS. For all these applications the driver power has not significantly improved.

To make DSL technology attractive, the overall power dissipation must be reduced beyond the presently offered solutions. This power dissipation manifests itself in the form of increased operation temperature of the equipment. A number of designs constraints are introduced in order to maintain circuits at a reasonable operating temperature, including the inclusion of additional fans, air conditioning, heat sinks and space for thermal ventilation. These constraints significantly increase the material, labor and maintenance cost associated with the system. Furthermore, excessive heat may restrict the density of equipment, thereby increasing the size of the facility hosting the system and/or limiting the number of customers that can be served by a fixed size facility. Thus, reducing the power consumption in communications systems can be a key aspect of any system design.

The line driver is a component that consumes a significant amount of power. Typically, the line driver includes an amplifier for receiving an analog signal from a preceding circuit, such as a digital to analog (DA) converter, to drive this signal through a source resistance and a line transformer onto a twisted pair telephone line or loop. The DSL line drivers commonly in use include a source resistance equal to the reference impedance of the loop, usually 100 ohms implemented as a series resistance. Typical line drivers use two amplifiers working differentially. A factor that exacerbates driver design is the presence of statistically infrequent high crest-factor occurrences in the received signal to be driven onto the loop.

One solution is to power the amplifiers from a single bipolar high voltage rail, typically +15V and −15V. The voltage being chosen so that the signal being driven is not clipped at the high crest factor occurrences. In this cases a large portion of the power is dissipated in the real source resistance used to match the impedance on the line.

Another solution uses a differential voltage rail, which requires the addition of a second voltage rail thereby increasing the required rails from two to four. The rails could be +12V(or +15V), −12V(or −15V), +5V and −5V. The high voltage rails handle the high crest factor occurrences, whereas the low voltage rails handle the normal signal condition. For example Texas Instruments THS6032 is an ultra low-power, differential line driver designed for Central Office (CO) ADSL applications. The THS6032 has Class-G architecture that enables the device to be powered from both low voltage and high voltage power supplies. The voltage rails are switched when low probability peak power events occur. In this way the low voltage rails are used most of the time thereby keeping power low. The high voltage rail is switched to gracefully when large signal levels are transmitted. In this way the high power dissipation is only encountered when actually required. The application of such an amplifier in xDSL modems is disclosed in U.S. Pat. No. 5,898,342.

The above solution is costly both from a direct cost and from a board space point of view. Accordingly there is a need for a low power drive stage that is capable of handling high crest factors while mitigating at least some of the above disadvantages.

SUMMARY OF THE INVENTION

According to the invention, a telephone line feed circuit is provided for use with a telecommunication line which has dual drivers with transformer taps and a sensing circuit so that under normal drive conditions a first driver supplies substantially all power through a first transformer of a first turns ratio under normal input signal conditions and a second driver supplies substantially all power through a second transformer of a second turns ratio under high crest factor input signal conditions.

More specifically, a first driver circuit has an output connected via a first transformer having a first turns ratio to a tip terminal and a ring terminal of a telecommunication line, a second driver circuit has an output connected via a second transformer with a second turns ratio to the tip terminal and the ring terminal of said telecommunication line; and a switching circuit is provided sense and switch the input signal to the driver circuits so that substantially all of the drive power is provided by the first driver under normal input signal conditions and substantially all of the drive power is provided by the second driver under high crest factor input signal conditions, the turns ratios of the two transformers having been selected such that the signal driven onto the line is not clipped.

In an embodiment the driver circuits includes an active impedance synthesis circuit for generating the line impedance for DSL signals.

In a further embodiment of the invention the line feed circuit is coupled to an integrated POTS/xDSL line card.

These and other features of the embodiments of the invention will become more apparent in the following detailed description in which reference is made to the appended drawings.

DESCRIPTION OF SPECIFIC EMBODIMENTS

Figure 1:
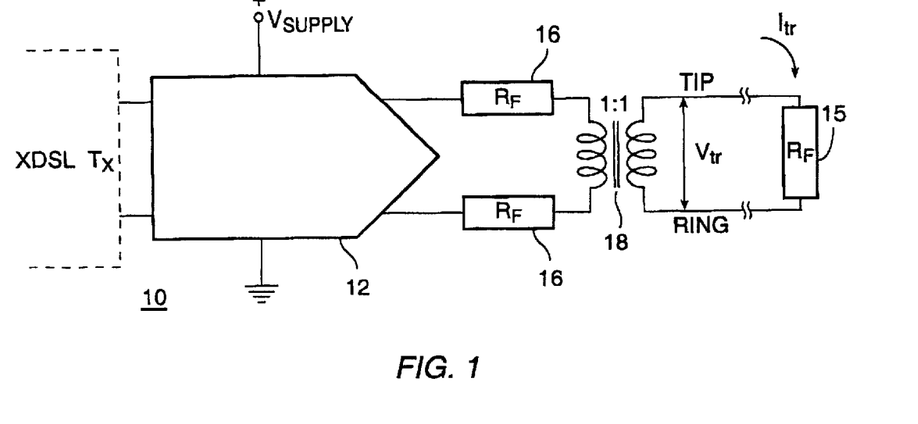
FIG. 1 is a schematic diagram of a line feed circuit with a series source resistance according to the prior art.

Referring to FIG. 1, a line feed circuit 10 according to the prior art is shown generally by numeral 10. The line feed circuit 10 includes driver stage 12, feed resistors 16 and a line transformer 18. The driver stage 12 normally comprises two driver amplifier circuits 14 and 16 (normally fixed-gain amplifiers) for supplying a subscriber line comprising tip T and ring R lines, via respective series feed resistors $R_F$ 18. A load resistance $R_L$ normally terminates the line. For xDSL signals the line is normally terminated by a load resistance $R_L$ of typically 100 ohms, thus the series feed resistors $R_F$ are chosen to equal the reference impedance of the loop, i.e., 50 ohms each. Other values of the feed resistors are chosen for different signals such as POTS signals. Furthermore as illustrated in FIG. 1, the drive amplifiers 14 and 16 are each powered by $(+)V_{supply}$ voltage rails referenced to ground. Alternatively the drive amplifiers may be powered by $(-)V_{supply}/2$ and $(+)V_{supply}/2$ voltage rails.

For convenience the following definitions of specific terms that are used in the following description are provided:

- $V_h$=total voltage headroom required on side of the voltage rail for allowing proper biasing of the drive amplifiers, typically 3V/2;
- $R_S$=total source resistance;
- $R_{tr}$=tip and ring load resistance, 100 ohms for xDSL;
- $V_{tr}$=tip and ring voltage, 2V rms;
- $I_{tr\ldots}$=tip and ring current, 20 mA rms (or 16.2 dBm into 100 ohms);
- σ=CF=crest factor, which is the ratio of the peak signal to the rms signal (typically 5.3 for the g.Lite standard);
- $R_L$=load impedance;
- $R_F$=feed impedance;
- n=transformer turns ratio;
- $V_{P/d}$=peak output voltage at one driver;
- $P_t$=total power for two driver amplifiers;
- $V_{P-P}$=total peak-to-peak voltage at output of drivers;
- $I_b$=quiescent bias current per drive amplifier;
- $V_{supply}$=total driver amplifier supply voltage across supply rails; and
- $\sqrt{2}/\pi$=(average DSL current)/(rms DSL current).

Referring back to the circuit of FIG. 1, the peak voltage at one driver may be derived as follows:

$$V_{p/d}=(R_F+R_L)/(n*R_L)*V_{tr}/2*\sigma;$$

the supply voltage rails required, given the desired voltage headroom above is then given by:

$$V_{supply}=(V_h+V_{p/d})*2.$$

The total differential driver power consumption for xDSL signals can be defined in terms of the driver supply voltage and the required current to be driven onto the line, as follows:

$$P_t=V_{supply}*(\sqrt{2}/\pi*n*V_{tr}/R_L+2*I_b)$$

$$P_{drive}=2*(V_h+((R_S+R_{tr})/(n*R_{tr})*V_{tr}/2*\sigma)*(\sqrt{2}/\pi*nV_{tr}/R_L+2*I_b) \quad (1)$$

The supply voltage $V_{supply}$ is a function of the total resistance, the current and the crest factor (signal excursion) requirement. Power consumption can be calculated for the circuit in FIG. 1 assuming

- $C_F$=5.3;
- $V_h$=1.5V;
- $R_F$=100Ω; and
- $R_L$=100Ω.

Then using equation (1) the driver power:

$$P_{drive}=2*(1.5V+(2*2V_{rms}/2*5.3))*\sqrt{2}/\pi*2/100+2*7 \text{ mA}=557 \text{ mW}$$

One solution is to reduce the nominal DSL driver power consumption (ideally by 50%) by driving the DSL signal directly onto the line and not through a source resistance. A feedback circuit actively generates the source resistance.

Figure 2:
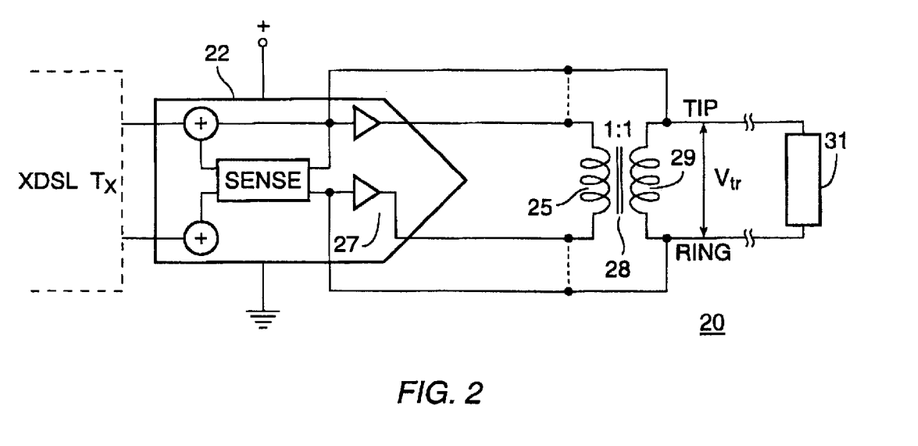
FIG. 2 is a schematic diagram of a direct-coupled line feed circuit.

Accordingly, referring to FIG. 2, a low power drive stage is shown generally by numeral 20. The drive stage 20 includes two drive amplifiers shown schematically by block 22 the outputs of which are each directly coupled to the secondary winding 25 of a 1:1 line transformer 28, the primary 29 of which is coupled to tip and ring lines. The amplifier 22 includes an impedance generation circuit for maintaining an optimum power transfer to the line by actively generating the equivalent source resistance 31. As illustrated the impedance generation circuit includes a feedback of the voltage or the current sensed, which is combined with the signal to be transmitted and fed through either a current amplifier or a voltage amplifier driving the line. The feedback is illustrated as being taken from the primary side of the transformer; however, it may equally well be taken from the secondary side of the transformer. For further details on directly coupling the driver stages to the line with active impedance generation, reference may be made to copending United States Patent Application, entitled "REDUCED POWER LINE DRIVER", which is in the name of the present inventors and which is assigned to the assignee of the subject application, and fully incorporated herein.

Power consumption for the circuit 20 of FIG. 2 is calculated as follows, assuming $R_F$=0—because the driver circuit 22 is coupled directly to the transformer 29—and $R_L$=100Ω; then from equation 1:

$$P_{drive}=2*(1.5V+(1*2Vrms/2*5.3*2))*\sqrt{2}/\pi*2/100+2*7 \text{ mA}=313 \text{ mW}.$$

Figure 3:
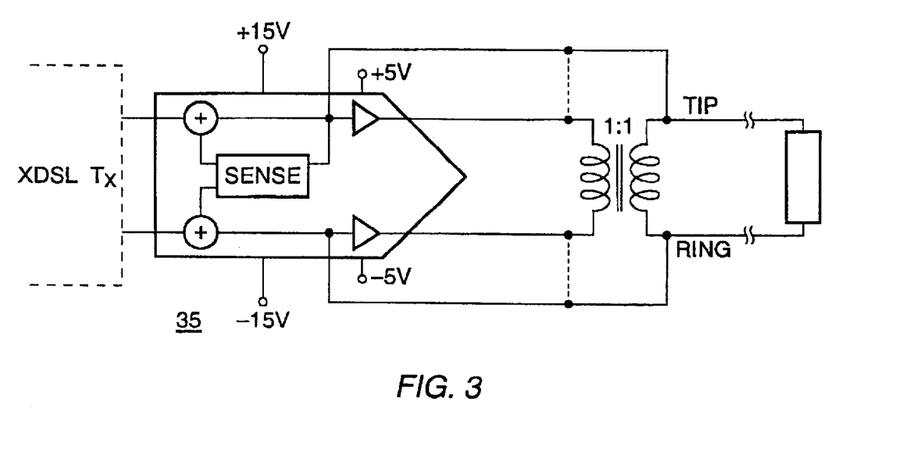
FIG. 3 is a schematic diagram of a dual power supply line feed circuit.

Referring to FIG. 3, a direct coupled line feed circuit 35 as illustrated in FIG. 2 is used; however in this embodiment of circuit 35 a dual power supply is provided to the amplifiers, similar to a class G arrangement.

Figure 4:
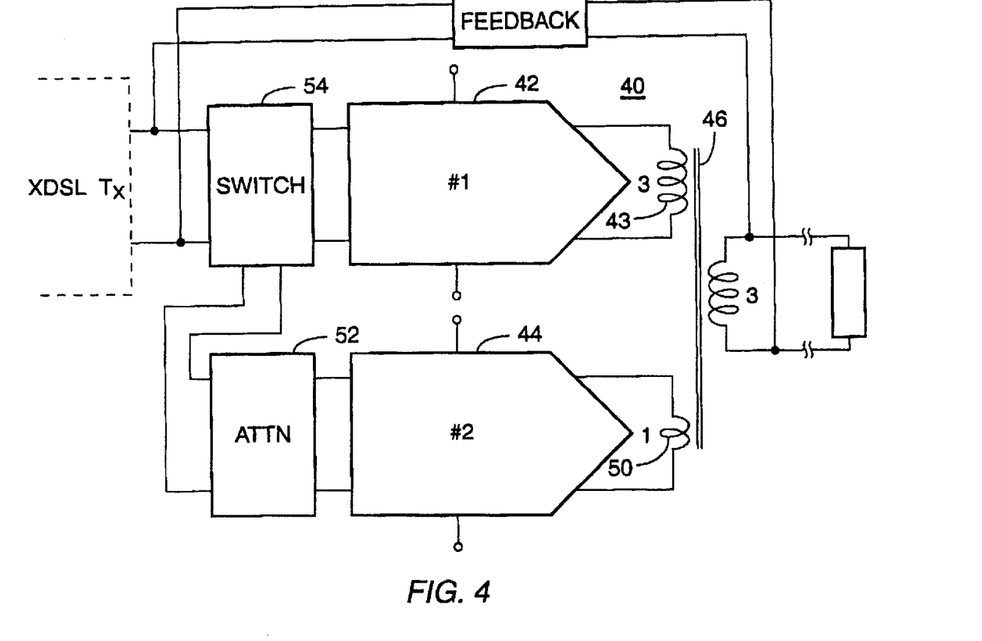
FIG. 4 is a schematic diagram of a dual transformer drive line feed circuit.

Referring now to FIG. 4, a generalized embodiment of a dual transformer driver circuit according to an embodiment of the present invention is shown generally by numeral 40. The circuit 40 comprises first and second dual amplifiers 42 and 44, the outputs of which are coupled to respective first 48 and second secondary 50 windings of a line transformer 46, and attenuation circuit 52 for attenuating an input signal $T_x$ received from an xDSL circuit (not shown) which is applied to the input of the second amplifier 44. The circuit 40 also includes a switching circuit 54 for monitoring the output signal from the xDSL circuit and applying the signal to the first amplifier 42 upon the occurrence of a statistically low crest factor signal and applying the output signal to the attenuator 52 coupled to the second amplifier 44 upon the occurrence of a statistically high crest factor signal. The ratios of the first secondary winding to its corresponding primary winding is chosen to be 1:1 (n1) while the ratio of the second secondary winding to its primary winding is chosen to be in the ratio of 1:3 (n2). It may be noted that the switching circuit may be placed at the output of the drivers or the drivers may be designed so that the second set of drivers exhibit a high output impedance when the first set of drivers are driving the line.

The circuit configuration 40 is shown with the amplifiers connected to their respective secondary windings without the use of typically serially connected feed resistors RF. In this implementation, it is assumed that the amplifiers may incorporate an impedance generation circuit as described with reference to FIG. 3 above. Furthermore, the implementation shown in FIG. 4 is used to facilitate an understanding of the operation of the circuit. The arrangements of this implementation are discussed hereinafter.

Referring back to FIG. 4, the general operation of the circuit may be explained as follows. In operation, the switch circuit 54 allows normal low level signals from the xDSL equipment to pass to the primary drive source (the first driver) 42 through the transformer 46 using a turns ratio n1 in the order of 1:1. This is a relatively low power circuit and need be supplied only from a single low voltage power supply.

Upon the occurrence of high crest factor signals, the switching circuit automatically diverts the signals to the second driver 44 which, because it is driving an attenuated version of these high crest factor signals, need only be supplied from the same low voltage supply. However, because of the higher turns ratio n2 in the order of 1:3, the voltage output on the tip and ring line is amplified by the appropriate amount. The signal diversion is invoked by causing the first driver to go to a high impedance state from its normal low impedance state when the second driver is providing the power to the loop, effectively opening the one circuit when the other circuit is closed. Similarly under low signal excursion the second driver goes to its high impedance state when the first driver is providing the power.

Thus, the second driver amplifier 44 dissipates only quiescent power when the primary drivers 42 are in control of the loop. The secondary power driver dissipation is only high when the primary drivers are not driving the loop. The second set of drivers are transparent to the primary set of drivers when the primary set of drivers are driving the loop.

Figure 5:
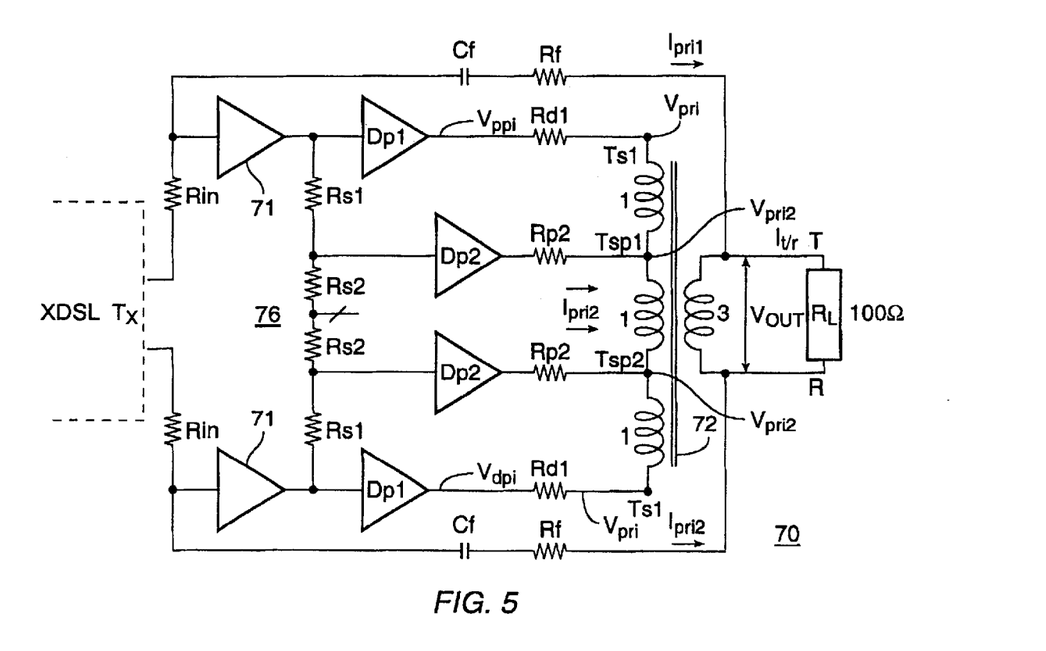
FIG. 5 is a schematic diagram showing an implementation of the circuit of FIG. 4.

Turning now to FIG. 5, a schematic diagram of a dual drive circuit, implemented according to the embodiment of FIG. 4, is shown generally by numeral 70. An output signal $T_x$ is coupled through an input resistor $R_{in}$ and a buffer amplifier 71 into a first pair of drive amplifiers $D_{p1}$, the outputs of which are coupled through a respective feed resistance $R_{d1}$ across the ends $T_{S1}$ of a secondary winding of the line transformer 72. The secondary winding of the transformer is partitioned by taps $T_{SP1}$ and $T_{SP2}$, such that each of the partitions having a secondary:primary turns ratio of 1:3 (n2). The primary winding of the transformer is coupled to the respective tip T and ring R lines of the loop. The first pair of drive amplifiers $D_{p1}$ thus see an effective turns ratio of 3:3 (n1).

A second pair of drivers $D_{p2}$ have their inputs connected by a resistive divider network 72 which performs the attenuation function in the input signal $T_x$. The outputs from the second pair of drivers $D_{p2}$ are each connected to a respective resistor $R_{p2}$ which is in turn connected to ones of the taps $T_{SP1}$ or $T_{SP2}$ on the secondary winding.

Thus the second pair of drivers see an effective turns ratio n2 between the secondary and primary of 1:3. An a.c. signal feedback path is implemented by a resistor $R_f$ and a capacitor $C_f$ coupled in series from the primary of the transformer to the input of the buffer amplifier 71.

Figure 6A:
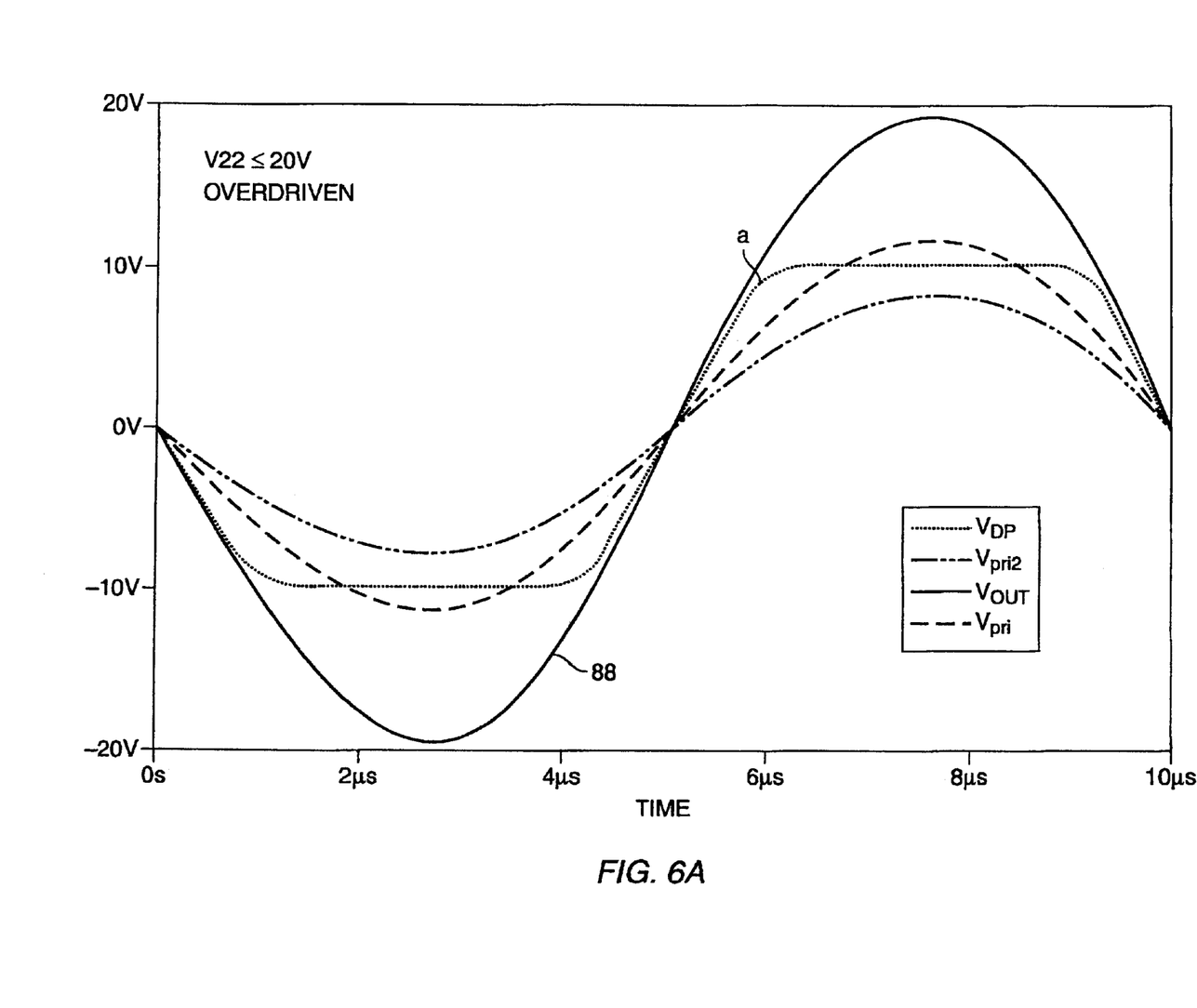
FIGS. 6(a)–6(d) are voltage and current waveforms for the circuit of FIG. 5.
Figure 6B:
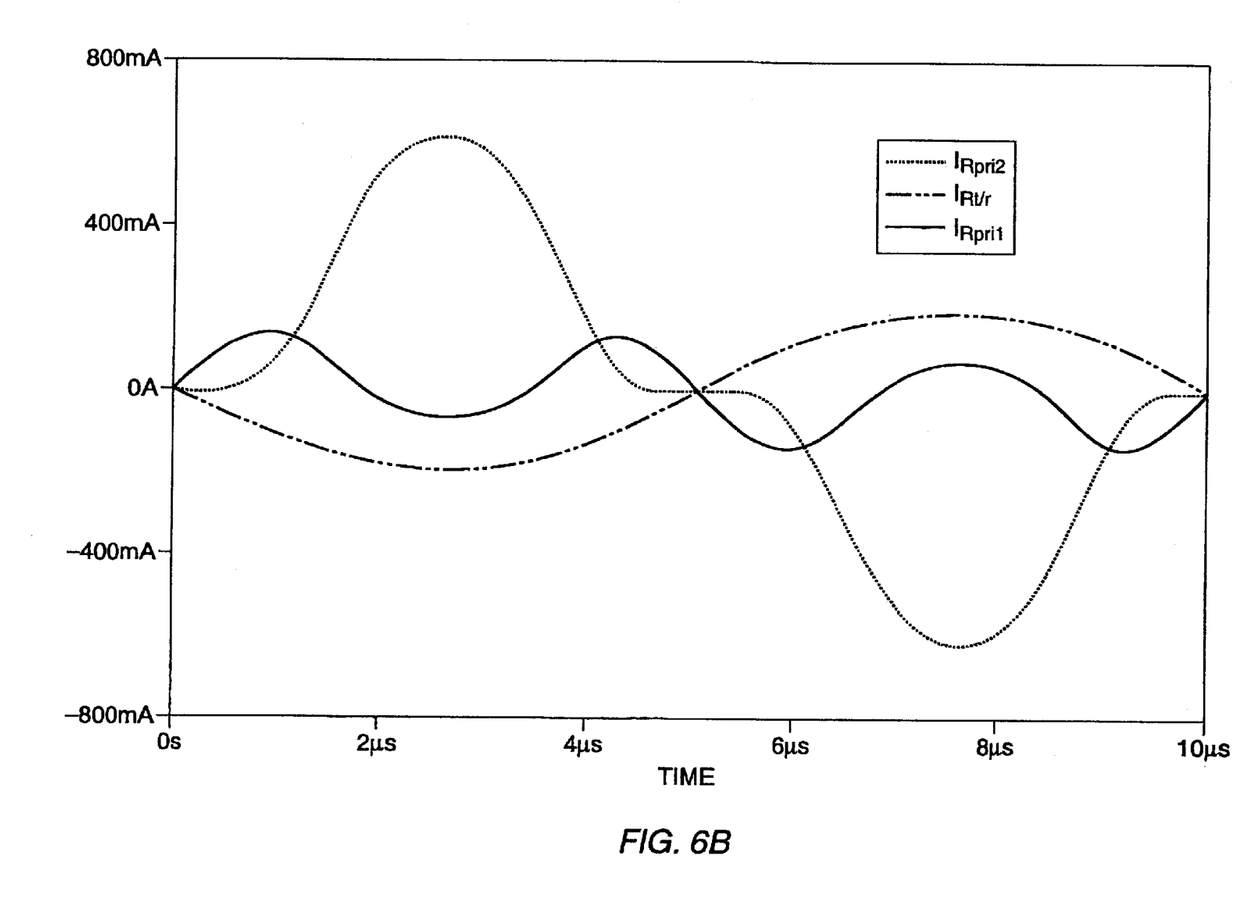
Figure 6C:
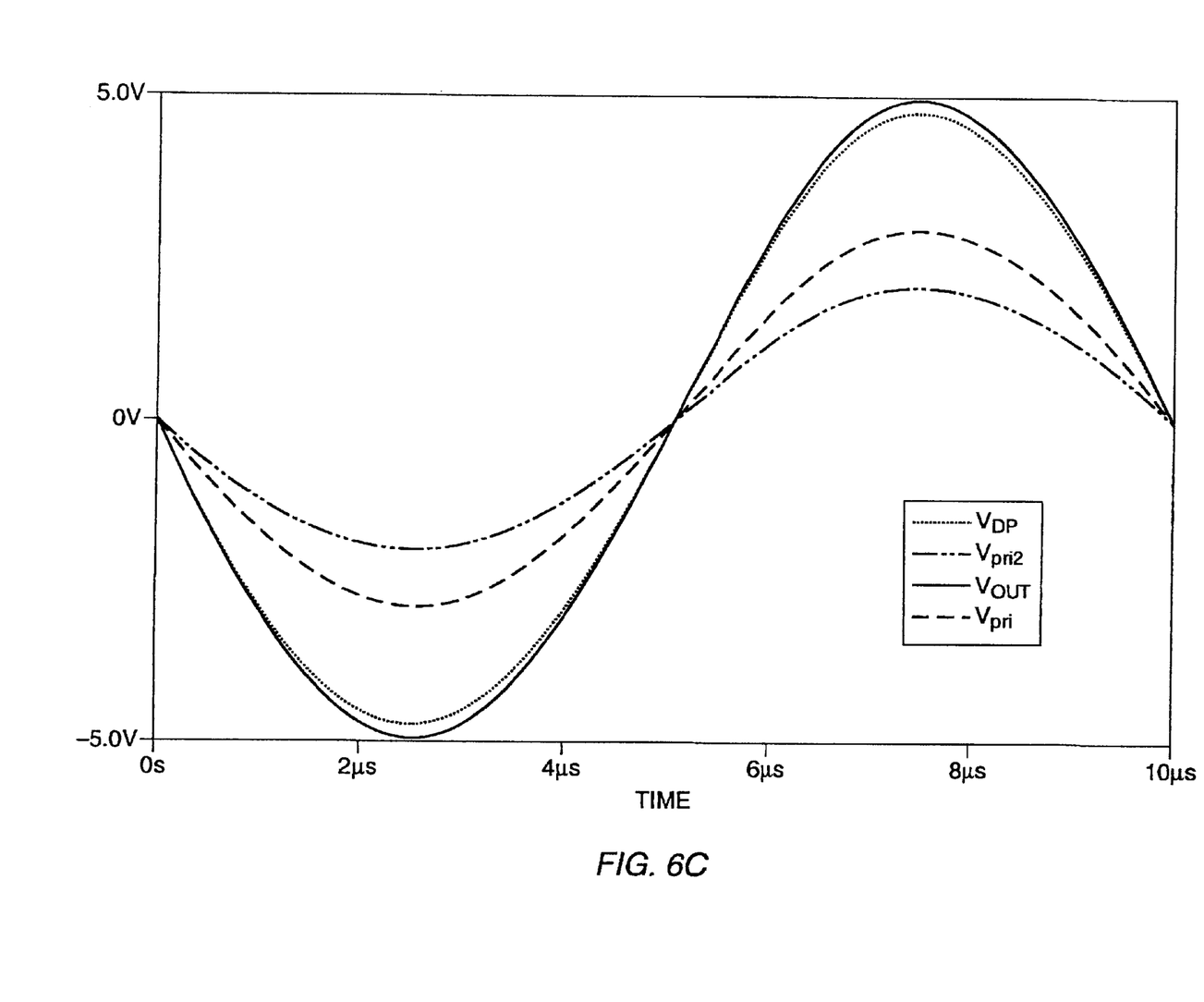
Figure 6D:
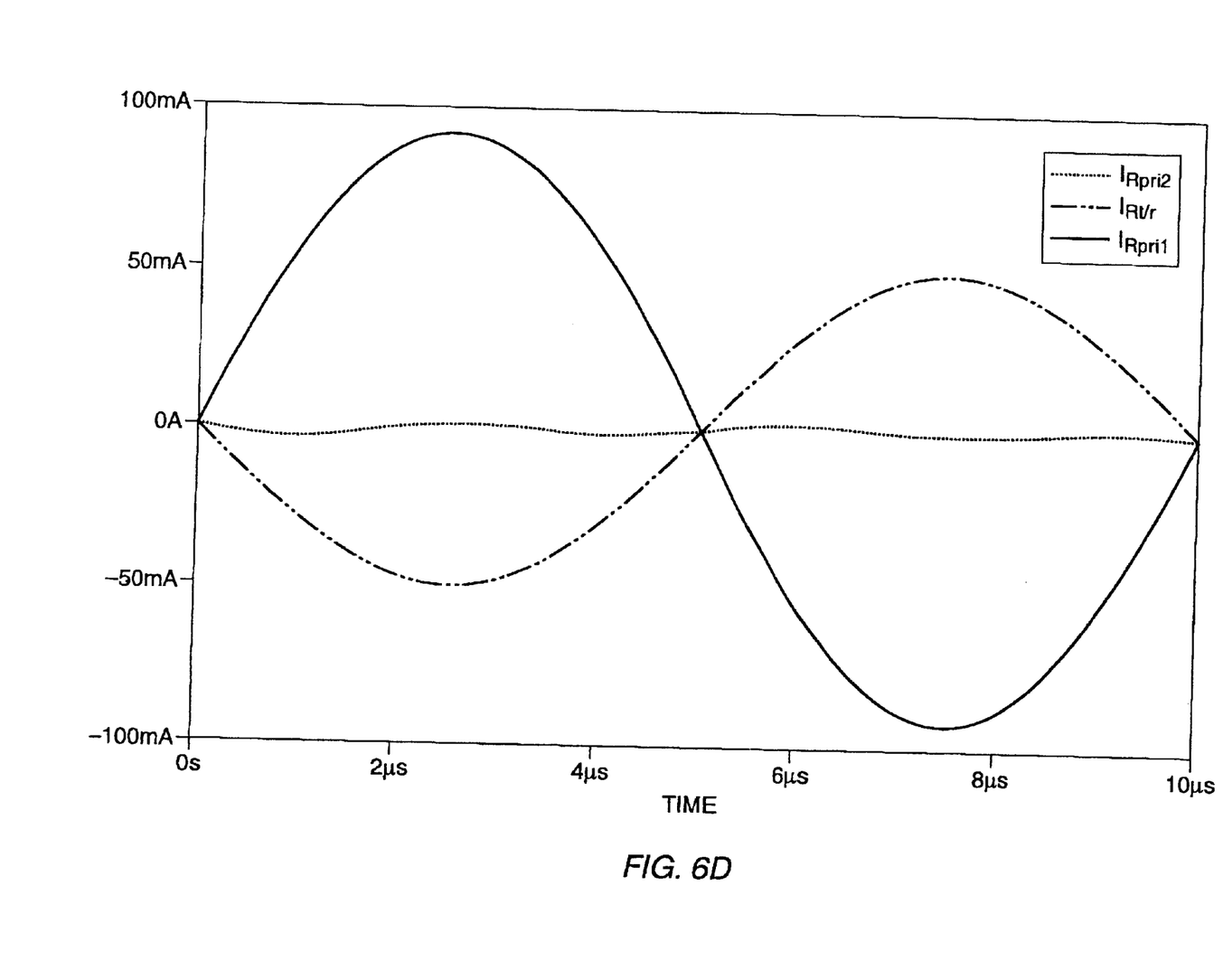

The operation of the circuit may be more clearly understood by referring to the voltage and current waveforms shown in FIGS. 6(a)–6(d) at various points as indicated in the circuit of FIG. 5. Specifically FIGS. 6(a) and 6(b) show respective voltage and current waveforms under overdrive conditions and FIG. 6(c) and 6(d) show respective voltage and current waveforms at points in the circuit under normal operating conditions. Under normal operating conditions, the first pair of driver amplifiers $D_{p1}$ provide substantially all the drive across the secondary windings of the transformer 72. The second pair of drivers $D_{p2}$ under these conditions receive a scaled version of the input signal due to the resistive divider network $R_{s1}$ and $R_{s2}$. Thus, the first set of drivers $D_{p1}$ provides a normal current to the secondary winding of the transformer and the $D_{p2}$ drivers ideally appear invisible in the circuit. That is ideally no current flows through $R_{p1}$ and $R_{p2}$ when the $D_{p1}$ drivers are in control.

Under overdrive conditions, i.e., at high crest factor occurrences, the drivers $D_{p1}$ tend to saturate as shown in the voltage plot $V_{Dp1}$ of FIG. 6(a). However, the drivers $D_{p2}$ which receive a scaled version of the input signal $T_x$ do not saturate and provide an unclipped output $V_{pri2}$ as shown in FIG. 6(a). This voltage is then stepped-up by the transformer due to the 1:3 turns ratio. The voltage output $V_{out}$ on the T and R line under overdrive conditions, is shown by the plot 88 in FIG. 6(a). Thus, it may be seen that when statistically low occurrence peaks occur, the $D_{p1}$ amplifiers run out of drive capability and the scaled $D_{p2}$ drivers take over the sourcing of current. Effective turns ratio for $D_{p2}$ drivers to the primary of the transformer is 1:3. In this way, a relatively low voltage supply is able to power the drivers. Furthermore, when the $D_{p1}$ drivers are sourcing current, the entire secondary side of the winding is used to couple the signal to the primary side.

Figure 7:
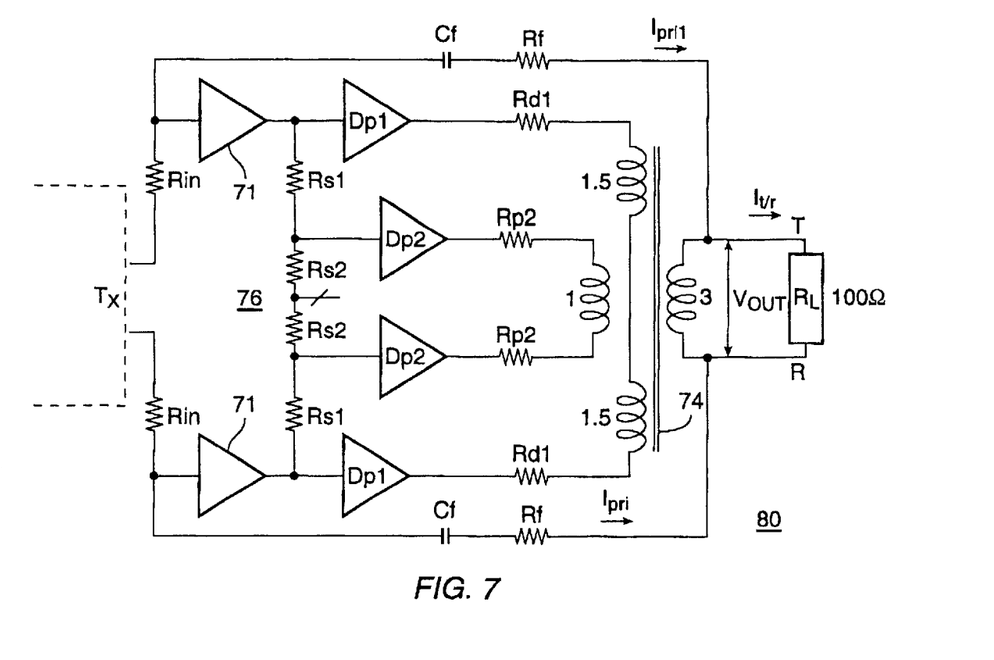
FIG. 7 is schematic diagram of a further implementation of the circuit of FIG. 4.

Referring to FIG. 7, a variation of the above circuit is shown generally by numeral 80. In this circuit 80, a separate set of secondary windings rather than a tapped secondary is used for the secondary drivers. Once again, as with the circuit shown in FIG. 5, the effective turns ratio n1 of the first transformer is 1:1 and the effective turns ratio n2 of the secondary transformer is 1:3. The operation of the circuit is otherwise the same as above.

In the circuits of FIGS. 5 and 7, it is assumed that the drivers are powered by a single rail power supply. Because large crest-factor signals occur statistically infrequently, the power consumed at these occurrences is negligible in comparison to normal conditions. Thus simply adding the $P_{dp1}$ power to the $P_{dp2}$ bias power approximates the total power consumed. The power consumption for the circuits 70 and 80 is, as given by the following equations:

$P_{dp2}(2)$bias=total bias power for both dp2 drivers $P_{dp1}(2)$=total power for both dp1 drivers in this case $\sigma=\sqrt{2}=1.414$ Using Equation 1

$P_{dp1}(2)=2*(1.5V+(1*2Vrms/2*1.414))*\sqrt{2}/\pi 2/100+2.7$ mA)= 5.83V*(9 mA+14 mA)=134 mW Vsupply=5.83 V $P_{dp2}(2)$bias=$V_{supply}*2I_{bias}$=5.83V*14 mA=82 mW $P_{total}=P_{dp1}(2)+P_{dp2}(2)$bias=134 mW+82 mW=216 mW Power comparison: 216/313=67%

The number of voltage rails required is one, in comparison to other solutions which require two or four voltage rails. Rail reduction 2/1 or 4/1=2 times or 4 times.

A comparison between the power consumption of traditional class G amplifiers and a circuit according to the present invention is shown as follows:

Class G approach biasing current effect:

$V_{cch}$, $I_{cch}$=bias high voltage and current $V_{ccl}$, $I_{ccl}$=bias low voltage and current $P_{bias}=(I_{cch}*V_{cch}(total)+I_{ccl}*V_{ccl}(total))*$# of amplifiers =(4 ma*30V+5 ma*10V)*2

=(120 mW+50 mW)*2

=340 mW

Dual drive, according to an embodiment of the present invention, with transformer taps approach:

$I_{cc}$, $V_{cc}$=supply bias current and voltage
$P_{bias}=I_{cc}*V_{cc}$(total)*# of amplifiers
=9 ma*5V*4
=180 ma The bias power savings: 180/340=53%

The circuits illustrated herein are merely exemplary and may be implemented in other forms as will be evident to those skilled in the art.

Although the invention has been described with reference to certain specific embodiments, various modifications thereof will be apparent to those skilled in the art without departing from the spirit and scope of the invention as outlined in the claims appended hereto.

What is claimed is:

1. A telephone line feed circuit for use with a telecommunication line, comprising:
   a) a first driver circuit having an output connected via a first transformer having a first turns ratio to a tip terminal and to a ring terminal of said telecommunication line;
   b) a second driver circuit having an output connected via a second transformer having a second turns ratio to the tip terminal and the ring terminal of said telecommunication line; and
   c) a switching circuit arranged to provide an input signal to said driver circuits so that substantially all of the drive power is provided by said first driver circuit under normal input signal conditions and substantially all of the drive power is provided by the second driver circuit under high crest factor input signal conditions, the turns ratios of the first transformer and of the second transformer being selected such that signals driven onto the line via said first driver circuit and said second driver circuit are not clipped.

2. A circuit as defined in claim 1, said driver circuits being operative to receive signals from an integrated POTS and xDSL line card.

3. A circuit as defined in claim 1, said driver circuit including an active impedance synthesis circuit for generating line impedance for DSL signals.

4. A circuit as defined in claim 3, wherein said impedance synthesis circuit is operative to synthesize an impedance by sensing a current in the telecommunication line and driving a voltage source with a corresponding voltage.

5. A circuit as defined in claim 4, wherein said current being sensed is on the secondary side of one of said transformers.

6. A circuit as defined in claim 4, wherein said current being sensed is on the primary side of one of said transformers.

7. A circuit as defined in claim 5, including a sense resistor coupled in series in said line.

8. A circuit as defined in claim 6, including a sense resistor coupled in series in said line.

9. A circuit as defined in claim 5, including a sense transformer coupled in series in said line.

10. A circuit as defined in claim 6, including a sense transformer coupled in series in said line.

11. A circuit as defined in claim 3, wherein said impedance synthesis circuit is operative to synthesize an impedance by sensing a voltage on the telecommunication line and driving a current source with a corresponding current.

12. A circuit as defined in claim 11, wherein said voltage being sensed is on the secondary side of one of said first and second transformers.

13. A circuit as defined in claim 11, wherein said voltage being sensed is on the primary side of one of said first and second transformers.

14. A circuit as defined in claim 1 wherein said first driver circuit is switched to a high impedance state from a low impedance state while said second driver circuit is providing power under high crest factor signal input conditions; and
   wherein said second driver circuit is switched to a high impedance state from a low impedance state while said first driver circuit is providing power low signal excursion conditions.

15. In telephone line feed circuit for use with a telecommunication line, said line feed circuit including a first driver circuit having an output connected via a first transformer having a first turns ratio to a tip terminal and to a ring terminal of said telecommunication line, a second driver circuit having an output connected via a second transformer having a second turns ratio to the tip terminal and the ring terminal of said telecommunication line, and a switching circuit, a method for inhibiting signal clipping comprising:
   providing substantially all of an input signal at normal input signal conditions by said first driver circuit; and
   providing substantially all of said input signal under high crest factor input signal conditions by said second driver circuit, wherein the turns ratios of the first transformer and the second transformers being selected such that the signal driven onto the line is not clipped.

16. The method according to claim 15 further including actively synthesizing impedance in said first and second driver circuits for generating line impedance for DSL signals.

17. The method according to claim 16 wherein said impedance synthesizing step includes synthesizing an impedance by sensing a current in the telecommunication line and driving a voltage source with a corresponding voltage.

18. The method according to claim 16 wherein said impedance synthesizing step includes synthesizing an impedance by sensing a voltage on the telecommunication line and driving a current source with a corresponding current.

19. The method according to claim 16
   wherein said first driver circuit is switched to a high impedance state from a low impedance state while said second driver circuit is providing power under high crest factor signal input conditions; and
   wherein said second driver circuit is switched to a high impedance state from a low impedance state while said first driver circuit is providing power.

* * * * *